March 5, 1940. J. MORELISSE 2,192,555
ELECTRICAL CONTROL SYSTEM
Filed Dec. 13, 1938
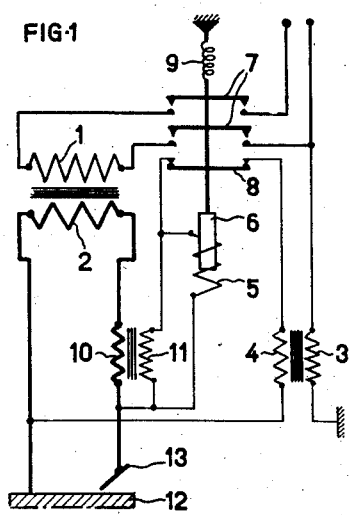
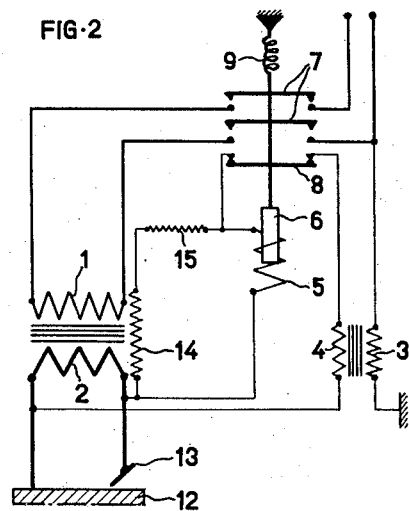
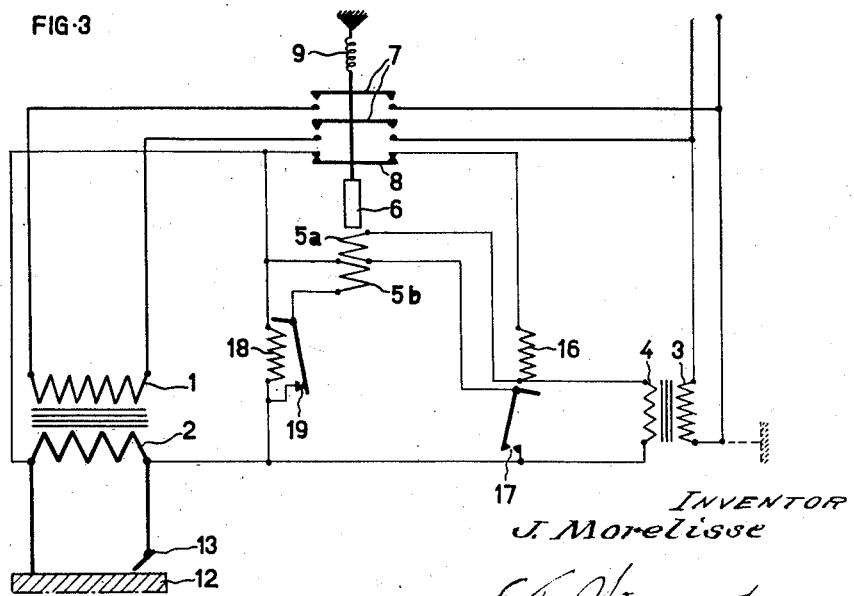
INVENTOR
J. Morelisse
BY E. F. Vinkroth
ATTORNEY Patented Mar. 5, 1940

2,192,555

UNITED STATES PATENT OFFICE 2,192,555

ELECTRICAL CONTROL SYSTEM

Jan Morelisse, Amsterdam, Netherlands

Application December 13, 1938, Serial No. 245,521
In the Netherlands December 21, 1937

8 Claims. (Cl. 171—97)

The invention relates to a safety device for transformers for use with welding or other types of intermittent loads, in which the electromagnetic switch for the primary circuit of the welding transformer is initially energised, when starting the welding or other similar operation, by means of an auxiliary transformer, whereas the primary circuit is broken simply by cutting off the load current. Subsequent description will assume welding as a typical operation. In a known device of this type, the said switch is maintained closed during welding by the said auxiliary transformer and it is consequently necessary to take steps to prevent the coil of the switch from remaining energised via the welding transformer when the welding arc has been extinguished. The result of this would otherwise be that the welding transformer would remain connected. In such known device, recourse is made to providing a special electromagnetic switch comprising a contact having delayed action. Now a contact is a rather vulnerable member and this is still more true of a delayed action contact, especially where the contact works rather often, namely at each interruption of the welding current.

According to the present invention the electromagnetic switch is maintained closed during welding by a current which is derived from the secondary welding circuit. When in this case the welding current is cut off, the switch no longer is maintained closed and the welding transformer is disconnected without fail.

According to my invention it is also possible to supply the switch holding current by means of a coil energized by the magnetic field. In this case it is desirable to insert in the switch holding circuit a current-limiting resistance or a set of working contacts for the electromagnetic switch.

The invention further comprises a modification in which a device is applied which comes into action when the voltage across the terminals of the secondary winding rises as a result of the cutting off of the welding current, and which device causes the switch to cut off. This device preferably is a no-voltage release relay which, in action, interrupts the circuit of the holding coil of the switch.

Some embodiments of the invention are illustrated in the accompanying drawing.

Figure 1 shows one arrangement,

Figure 2 shows an alternative arrangement, and

Figure 3 shows a third arrangement.

The welding or main transformer is represented by its primary winding 1 and its secondary winding 2; each in a corresponding circuit. The auxiliary current is obtained by an auxiliary transformer with primary winding 3 and secondary winding 4. An electromagnetic switch for the primary circuit of the main current has a solenoid 5, a core 6, working contacts 7 for the primary side of the welding transformer, a back contact 8 for the secondary circuit of the auxiliary transformer, and a return spring 9.

In the arrangement shown in Figure 1 the holding current for coil 5 originates from the primary winding 10 of a transformer inserted in the secondary welding circuit, the secondary winding of which is indicated at 11. This holding current may also be obtained by a resistance inserted in the welding circuit, whilst it is also possible to insert the winding 10 in a circuit shunting the welding current circuit.

The workpiece is indicated at 12 and the welding electrode at 13.

The connection according to Figure 1 and its effect are as follows. The primary winding 1 of the welding transformer is connected to the current supply via the working contacts 7. One end of the secondary winding 2 of the welding transformer is connected to the workpiece 12 and the other end is connected through the detaining coil—the primary winding 10 of the transformer 10, 11—with the welding electrode 13. It is possible to connect one winding, for instance, the primary winding 3, of the auxiliary transformer between the supply and earth, in which manner a control is obtained on the existence of a good earth connection.

The secondary coil 4 of the auxiliary transformer is connected via the back contact 8 and the coil 5 with the welding circuit. Moreover, the coil 5 is connected with the secondary holding coil 11, through a circuit in parallel with the secondary circuit of the auxiliary transformer 3, 4; in this circuit a working contact (not shown) of the electromagnetic switch may be inserted.

When the electrode 13 is moved along the workpiece 12, the secondary circuit of the auxiliary transformer 3, 4 is closed, so that coil 5 is energised. At this time the influence of the coil 11 is small even when no interruption is inserted therein, due to open circuit of the primary circuit of the main transformer. The core 6 is attracted against the influence of spring 9, by which the working contacts 7 are closed, so that the current passes through the primary winding 1. Consequently the secondary coil 2 is energised and a welding arc is formed. As now a current flows through the secondary welding circuit, the coil 5 is energised by the transformer 10, 11, so that the core 7 remains attracted notwithstanding that the current from the auxiliary transformer 3, 4, has been cut off owing to the interruption of the back contact 8. The coil 5 is now solely under influence of the current in the welding circuit, so that when this current disappears through the extinguishing of the welding arc the core 6 is released and is pulled upwards by spring 9. The system is returned to rest condition.

A possible disadvantage in this circuit arrangement is that, when the welding arc is not immediately formed and the electrode therefor must be again moved along the work piece, the switch opens, and must first be closed again. This necessity can be avoided by providing the switch with a retarding device which works when the switch is closed, but no load current flows, to retard the action of the no-current release means 5, 6. For instance, such a device may comprise a liquid damper, or a relay with retarded interruption inserted in the starting circuit. The time lag chosen may be for example two seconds, in which period the arc can be formed, without the switch switching off and on each time.

The connection according to Figure 1 has the disadvantage that the holding current for the coil 5 is dependent on the current adjusted for the welding circuit, which in practice may vary considerably. In order to meet this objection, the connection according to Figure 2 can be adopted.

In this case the holding winding for coil 5 is a coil 14 which is arranged round both limbs of the welding transformer 1, 2, so that the lines of force of the magnetic field pass through the same. The voltage induced in this coil 14 does not vary much.

It must be taken into account that the resistance of holding coil 14 is small, so that, when the holding circuit is not provided with a working contact interruption, a resistance 15 must be inserted to prevent control action while the starting circuit of the auxiliary transformer 3, 4, which is connected in parallel with coil 5, is energizing coil 5. It is likewise possible to insert a transformer instead of the resistance 15.

It is possible to replace the excitation coil 5 by a starting coil and a holding coil; this provides an absolutely free choice for the voltage of the auxiliary transformer 3, 4, which voltage remains on the electrode 13 when the welding transformer is inactive. Also a portion of coil 5 can be used for holding the core 6.

According to Figure 3 the coil of the electromagnet consists of a starting coil 5a and a holding coil 5b, while 16 indicates a relay with retarded cut-off, provided with a working contact 17, and 18 is an over-voltage release relay provided with a back contact 19.

When the electrode 13 is moved along the workpiece 12, the following circuit is closed, workpiece 12, back contact 8, coil of relay 16, secondary winding 4, electrode 13. The coil of relay 16 is thus energised and the working contact 17 is closed; thus the circuit is closed which is in parallel with the first-mentioned circuit to the coil 4 and which contains the starting coil 5a, and which is kept closed for some time, for example two seconds, by the starting time-lag relay. Coil 5a is energised and the core 6 is pulled downwards, closing the working contacts 7 and opening the back contact 8. A current now flows through the primary winding of the transformer so that the welding arc can be formed in the secondary circuit.

After the switching-off time of relay 16 has elapsed, coil 5a becomes dead, but in the meantime a current flows through the holding circuit of coil 5b, which is in parallel with the secondary coil 2, assuming that the welding arc has been formed, so that the switch remains closed. The coil of relay 18 is chosen in such a way that it cannot attract its core as long as the welding voltage is at working value (corresponding with the arc voltage of 25–35 volts) but so that it does attract its core as soon as this voltage rises considerably, to no voltage, as is the case when the arc is extinguished.

When the arc is extinguished the back contact 19 is broken, so that the coil 5b becomes dead, and the return spring 9 opens the switch.

It is possible to choose the energising voltage of relay 18 in such a way that switching-off not only occurs when the welding current disappears entirely but also when this current decreases to such a value that good welding cannot be carried out.

An advantage of the protecting device according to the invention is that this does not necessitate alterations in the welding transformer, so that it may be mounted on any existing transformer without any difficulty.

The device according to the invention can be applied independently of the manner in which the strength of current of the welding transformer is adjusted, thus either when this is caused by means of a magnetic shunt or a fixed coil arranged round both limbs of the transformer and connected in series with one of the windings of the latter, or by a rotatable coil connected in the same manner or a combination thereof.

Having now particularly described and ascertained the nature of my said invention and in what manner the same is to be performed, I declare that what I claim is:

1. An electrical system, comprising a main transformer, having a primary circuit and a secondary circuit, said secondary circuit having an intermittent load therein, a source of electrical energy and an electromagnetic switch, normally open, in said primary circuit, auxiliary electrical means for energizing said switch to close the same, to energize said primary circuit from said source of energy, means responsive to closure of said switch for deenergizing said auxiliary means, and holding means responsive to energization of said secondary circuit to hold said switch in closed position, deenergization of said secondary circuit upon occurrence of open-circuit in the load therein resulting in deenergization of the holding means and opening of said electromagnetic switch.

2. An electrical system, comprising a main transformer having a primary and a secondary circuit, said secondary circuit having an intermittent load therein, a source of electrical supply and an electromagnetic switch, normally open, in said primary circuit, said switch having working contacts in said primary circuit, and a back contact, a solenoid for actuating said electrical switch, an auxiliary transformer energized by said source of supply, and in turn energizing said solenoid through said back contact, thereby causing closure of said switch, and a transformer, the primary winding of which is in said secondary circuit, for holding said solenoid energized when movement of said switch opens said back contact, deenergization of said secondary circuit upon occurrence of open circuit in the load therein resulting in deenergization of said last-mentioned transformer and opening of said switch.

3. An electrical system, comprising a main transformer having a primary circuit and a secondary circuit, said secondary circuit having an intermittent load therein, a source of electrical supply and an electromagnetic switch, normally open in said primary circuit, auxiliary electrical means for energizing said switch to close the same, to energize said primary circuit from said source of supply, time-lag means for holding said auxiliary electrical means, once actuated, energized for a predetermined time interval, means responsive to closure of said switch for deenergizing said auxiliary means, but effective only after expiration of said time interval, and holding means responsive to energization of said secondary circuit to hold said switch in closed position, deenergization of said secondary circuit upon occurrence of open-circuit in the load therein resulting in deenergization of the holding means and opening of said electro-magnetic switch.

4. An electrical system comprising a main transformer having a core, a primary circuit and a secondary circuit, a source of electrical supply and an electromagnetic switch, normally open, in said primary circuit, said secondary circuit having an intermittent load therein, auxiliary electrical means, fed from said source of supply, for energizing said switch to close the same, to energize said primary circuit from said source of supply, means responsive to closure of said switch for deenergizing the auxiliary means, a holding coil on said core, energized upon energization of said secondary circuit, to hold said switch in closed relation, deenergization of said secondary circuit upon occurrence of open-circuit in the load resulting in deenergization of the holding coil and opening of said electromagnetic switch.

5. An electrical system comprising a main transformer having a core, a primary circuit and a secondary circuit, a source of electrical supply and an electromagnetic switch, normally open, in said primary circuit, said secondary circuit having an intermittent load therein, auxiliary electrical means, fed from said source of supply, for energizing said switch to close the same, to energize said primary circuit from said source of supply, means responsive to clousre of said switch for deenergizing said auxiliary means, a holding coil on said core, energized upon energization of said secondary circuit, to hold said switch in closed position, means in circuit with said holding coil, tending to prevent passage of current through said coil until the primary circuit is energized, deenergization of said secondary circuit upon occurrence of open-circuit in the load resulting in deenergization of the holding coil and opening of said electromagnetic switch.

6. An electrical system, comprising a source of alternating-current supply, a main transformer, having a primary and a secondary circuit, and energized by said source of supply, said secondary circuit having an intermittent load therein, an electromagnetic switch in said primary circuit, a solenoid for operating said switch, a starting coil for said solenoid, an auxiliary transformer for energizing said starting coil, to close said switch, a holding coil for said solenoid, a voltage-responsive device controlled by said secondary circuit for energizing said holding coil upon energization of said main transformer, and means responsive to energization of the primary circuit for deenergizing the starting coil, deenergization of said secondary circuit upon occurrence of open-circuit in the load resulting in deenergization of the holding coil and opening of said electromagnetic switch.

7. An electrical system, comprising a source of alternating-current supply, a main transformer, having a primary and a secondary circuit, and energized by said source of supply, said secondary circuit having an intermittent load therein, an electromagnetic switch in said primary circuit, a solenoid for operating said switch, a starting coil for said solenoid, an auxiliary transformer for energizing said starting coil, to close said switch, a holding coil for said solenoid, means responsive to the energization of the primary circuit for deenergizing the starting coil, an overvoltage release relay, the coil of which is connected across said secondary circuit, and the armature of which closes an energizing circuit for said holding coil upon energization of said primary circuit; increase of voltage across the secondary winding upon the appearance of no-load condition resulting from open-circuit in the load causing sufficient energization of the relay armature to break the circuit to the holding coil, and opening of the electromagnetic switch.

8. An electrical system, comprising a source of alternating-current supply, a main transformer, having a primary and secondary circuit, and energized by said source of supply, said secondary circuit having an intermittent load therein, an electromagnetic switch in said primary circuit, a solenoid for operating said switch, a starting coil for said solenoid, an auxiliary transformer for energizing said starting coil, a time-lag relay in the circuit of said starting coil, for ensuring energization of the circuit of the starting coil, once closed, for a predetermined time interval, energization of said starting coil closing said switch, a holding coil for said solenoid, a voltage-responsive device controlled by said secondary circuit for energizing said holding coil upon energization of said main transformer, and means repsonsive to energization of the primary circuit for deenergizing the starting coil, said starting coil being deenergized, however, only after the expiration of said time interval, deenergization of said secondary circuit upon occurrence of open-circuit in the load resulting in deenergization of the holding coil and opening of said electromagnetic switch.

JAN MORELISSE.